A. KOWALSKY.
MOLDING MACHINE.
APPLICATION FILED SEPT. 26, 1911.
1,039,143.
Patented Sept. 24, 1912.
4 SHEETS—SHEET 1.
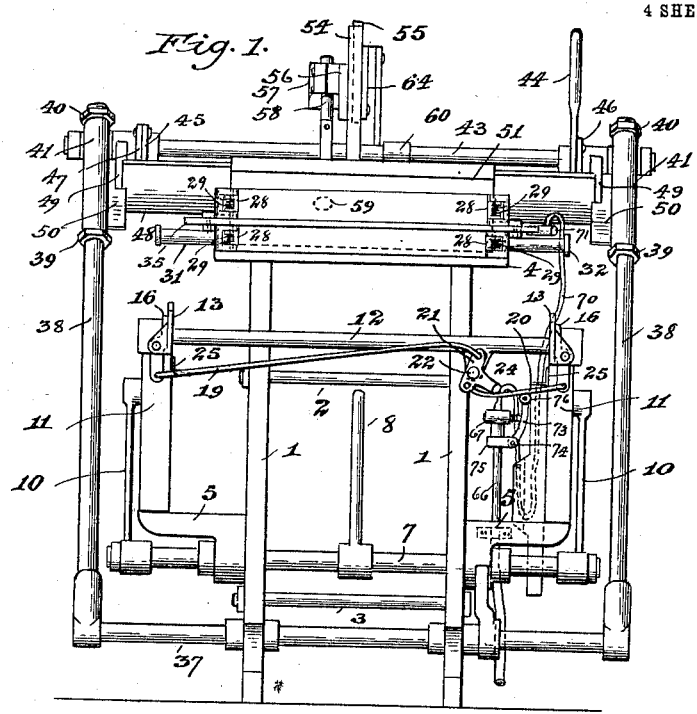
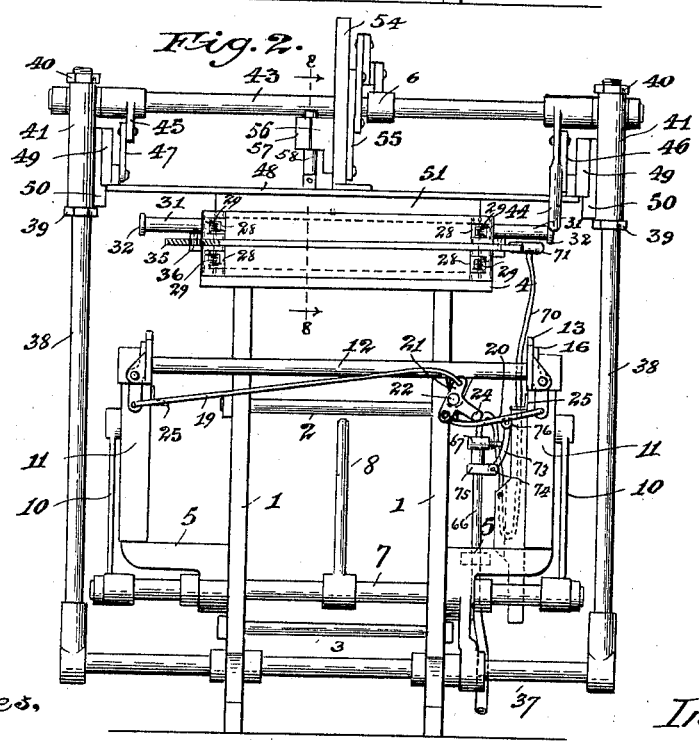
Witnesses,
Inventor,
Andrew Kowalsky,
By Offield, Towle, Graves & Offield
Attys.
COLUMBIA PLANOGRAPH CO., WASHINGTON, D. C.

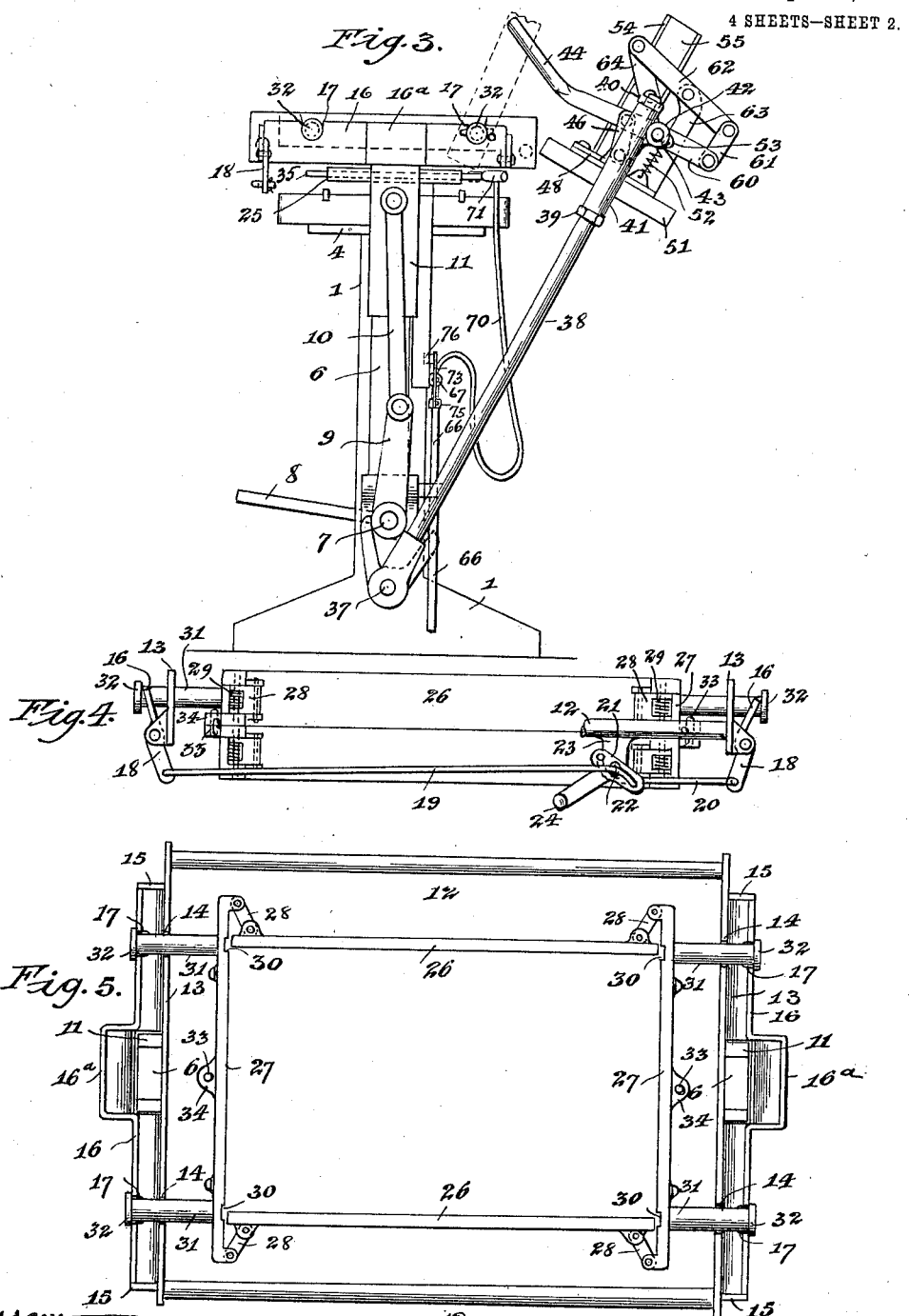

A. KOWALSKY.
MOLDING MACHINE.
APPLICATION FILED SEPT. 26, 1911.
1,039,143.
Patented Sept. 24, 1912.
4 SHEETS—SHEET 3.
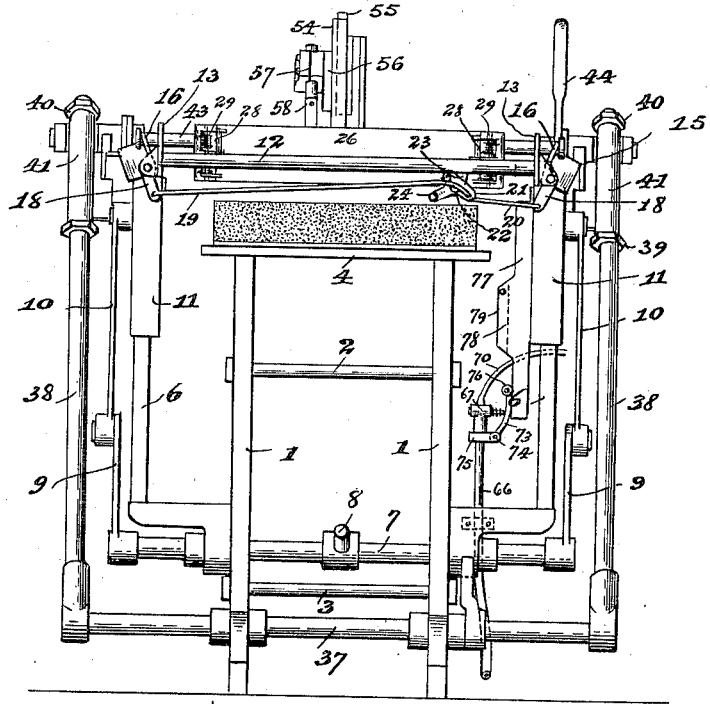
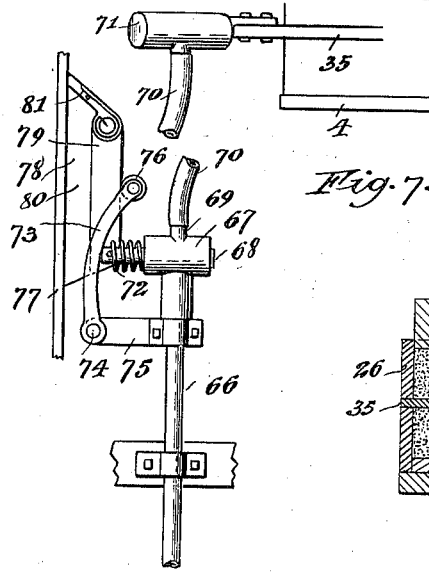
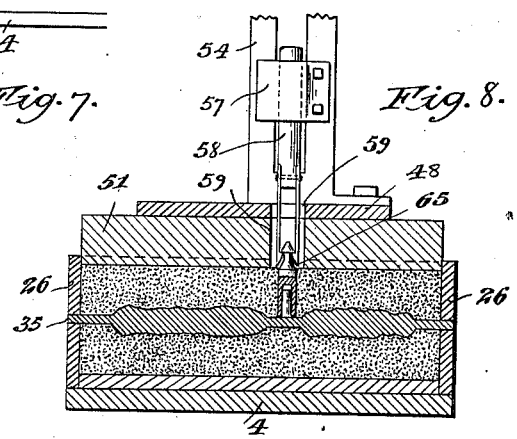
Witnesses,
T. D. Mann
S. N. Pond
Inventor,
Andrew Kowalsky,
By Offield, Towle, Graves & Offield
Atty's.

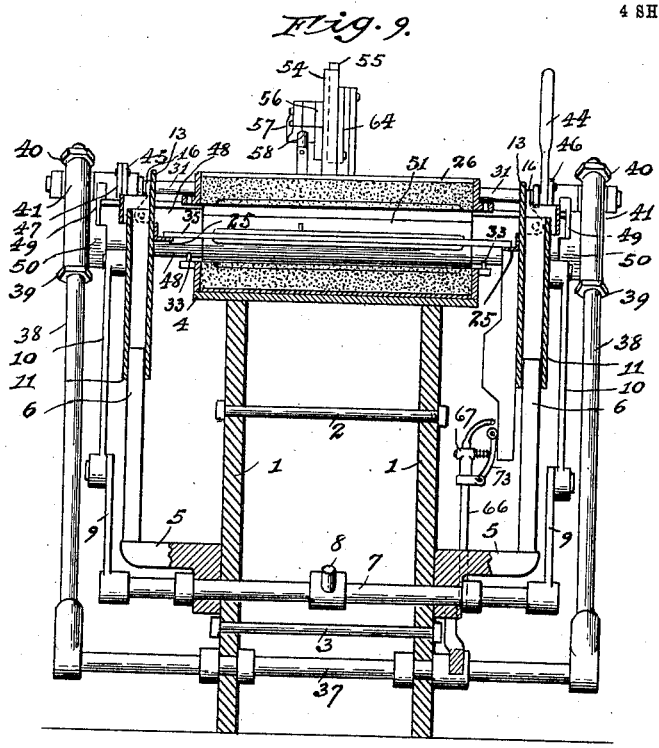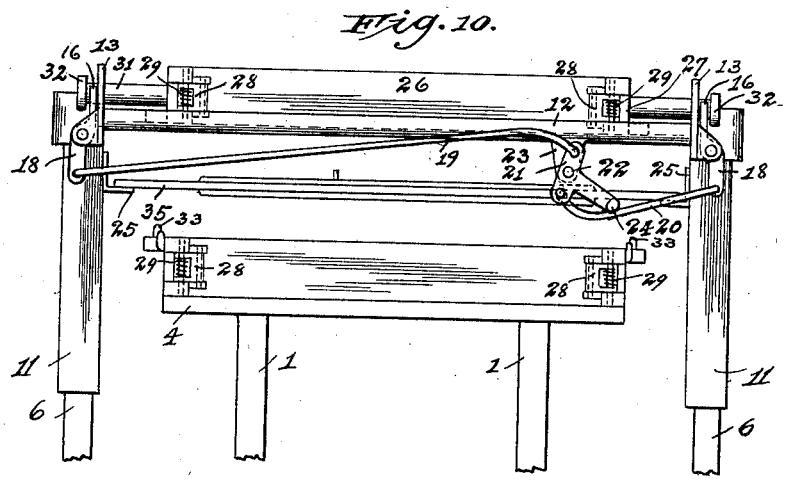

UNITED STATES PATENT OFFICE.

ANDREW KOWALSKY, OF CHICAGO, ILLINOIS.

MOLDING-MACHINE.

1,039,143. Specification of Letters Patent. Patented Sept. 24, 1912.

Application filed September 26, 1911. Serial No. 651,322.

*To all whom it may concern:*

Be it known that I, ANDREW KOWALSKY, a citizen of the United States, residing at Chicago, in the county of Cook and State of Illinois, have invented certain new and useful Improvements in Molding-Machines, of which the following is a specification.

This invention relates to that type of molding machines wherein the flask consists of a cope and drag with an interposed pattern plate, and wherein the flask, after being loaded with sand, is squeezed, and the pattern plate and pattern subsequently withdrawn.

Machines of this type have heretofore required more or less manual handling of the flask in connection with the performance of the several operations thereon.

The main object of my invention is to provide a machine wherein the several operations, including the jarring of the pattern plate may be successively performed in proper order and relation with but a minimum manual handling of the flask between successive operations, thereby saving time and lessening the liability of injuring or spoiling the mold.

To this and other minor ends my invention consists in a molding machine having the novel features of construction and operation substantially as hereinafter described and more particularly pointed out in the claims.

A machine embodying my improvements in one practical mechanical form is illustrated in the accompanying drawings, in which,—

Figure 1 is a front elevation showing the machine in a position in which the flask is inverted, the drag filled with sand, the lifting frame fully lowered, and the squeezing frame swung back. Fig. 2 is a similar view showing the flask upright, that is, with the cope above the drag and the machine in flask-squeezing position. Fig. 3 is a side elevational view from the right of Figs. 1 and 2, showing the squeezing frame swung back, and the cope, pattern plate, and drag, separated to permit the withdrawal of the pattern plate. Fig. 4 is a front elevational detail of the flask showing the walls of the cope and drag spread and also showing in part the mechanism for effecting the spreading of said walls. Fig. 5 is a top plan view of the parts shown in Fig. 4, showing the spread position of the walls of the cope. Fig. 6 is a front elevation showing the spread cope and drag raised above the completed mold to permit the removal of the latter from the machine. Fig. 7 is a detail elevation of a mechanism for effecting the automatic jarring or jolting of the pattern plate simultaneously with the inception of the separating movement of the cope, drag and pattern plate. Fig. 8 is a detail view in transverse section though the flask and squeezer mechanism, showing also an automatic device for extracting a sprue. Fig. 9 is a vertical central section through the machine, showing the parts in the relative positions illustrated in Fig. 3 but in a plane at right-angles to that of the latter figure. Fig. 10 is an enlarged detail view in elevation showing the flask and pattern plate separating device in operated position.

Referring to the drawings, 1 designates each of a pair of stationary parallel upright frame members adapted to rest at their lower ends on a suitable foundation and rigidly connected by tie-bolts 2 and 3 and supporting a fixed table or platform 4. Secured to the outer sides of the frame uprights 1 are brackets 5, from which rise vertical posts 6 that constitute guides for a reciprocating flask-separating frame hereinafter described.

Journaled in and between the main frame uprights 1 is a rock-shaft 7, provided with a central arm 8 for manually actuating the same. The outer ends of the rock-shaft 7 carry crank-arms 9 that are connected by pitmen 10 with the outer sides of vertical sleeves 11 that are slidably mounted on the guides 6. The sleeves 11 are rigidly secured to and support a rectangular flask-opening and spreading frame best shown in the plan view, Fig. 5, and comprising rigidly connected longitudinal and transverse bars 12 and 13, respectively, to the centers of which latter the upper ends of the sleeves 11 are rigidly secured. The longitudinal bars 12 are herein shown as rods, while the transverse or end bars 13 are flat strips, the upper edges of which are formed with semicircular notched seats 14 for a purpose hereinafter explained.

On the outer sides of the bars 13 are ears 15, in and between which are hinged, one on the outer side of each frame-bar 13, spreader-bars 16, the upper edges of which are likewise formed with substantially semi-circular notches 17 opposite the notches 14 of the frame-bars 13. The spreader-bars 16 are formed with central outwardly off-set portions 16ª to clear the upper ends of the guide-posts 6. On one end of each of the spreader-bars 16 is a depending arm 18, the lower ends of said arms 18 being connected by links 19 and 20, respectively, to the opposite ends of a lever 21 that is pivoted centrally at 22 to a depending bracket 23 on the longitudinal frame-bar 12 and is provided with an actuating handle 24 for swinging the same, whereby the spreader-bars 16 may be rocked between a position in which they lie against and parallel with the frame bars 13, as shown in Fig. 1, and a position wherein they are swung outwardly at an angle to the frame-bars 13, as shown in Figs. 4, 5, and 6.

To the inner sides of the sleeves 11 are rigidly secured a pair of horizontal angle-bars 25, these latter being located slightly below and parallel with the transeverse end bars 13 of the flask-separating and spreading frame. The function of these angle-bars 25 is to engage the ends of the pattern-plate and lift the latter from the drag after the cope has been raised off the pattern-plate.

The flask itself is of the two-part, or cope-and-drag type, adapted for the interposition of a pattern-plate, and the cope is provided at its ends with means adapted to be engaged by the flask-separating frame above described to raise it off the pattern-plate; and, in the preferred construction, both the cope and drag are so constructed as to be capable of spreading under the action of the spreader-bars 16, so as to separate their four walls from the contained sand-mold. Fig. 5 clearly shows the structure of the upper member or cope, and it will be understood that the lower member, or drag, has the same structure, minus the lifting means at the ends.

Referring then, more particularly, to Figs. 4, and 5, 26 designates the longitudinal or side walls and 27 the transverse or end walls of the cope. The adjacent ends of the side and end walls at the several corners are connected by pivoted links 28, which latter are normally urged by springs 29 in a direction to carry the ends of the side walls 26 into notches 30 formed in the inner faces of the end walls 27, to thereby make tight joints when the walls of the flask are in normal or contracted position. It will be seen that by reason of this structure, an outward pull on either end or side walls will effect a spreading movement of all four walls, as shown in Fig. 5. To the outer sides of the end walls 27 of the cope are rigidly secured horizontal outwardly projecting studs 31 having on their outer ends heads 32. These studs 31 are adapted to be engaged by the notches 14 of the cope-lifting frame as well as by the notches 17 of the spreader-bars 16, in a manner and for the purposes more fully set forth in the description of the operation of the machine. The end walls of the cope and drag are further provided, the one with a projecting pin and the other with an apertured ear or lug to receive said pin. As herein shown, each end wall of the drag carries a laterally off-set upstanding pin 33 that is adapted to engage an apertured ear 34 projecting from each end wall of the cope to lock the two together for transmitting the spreading movement of the cope to the drag when raising the flask off the mold in the final operation, as well as for locking the pattern-plate in accurate position between the cope and drag during the compression of the mold.

35 designates the pattern-plate adapted to be set between the cope and drag during the squeezing operation, this pattern-plate being of such length as to project beyond the ends of the cope and drag, and such projecting ends being formed with apertures 36 adapted to register with the apertures in the ears 34 and to receive the pins 33.

For coöperating with the main features of the machine above described, any suitable or approved squeezing-head and actuating mechanism may be employed, but I have herein shown a practical form of such mechanism well adapted for the present machine. Referring thereto, 37 designates a rock-shaft journaled in and between the main frame uprights 1 near the lower ends thereof, the ends of said rock-shaft having fast thereon upwardly extending tension rods 38, the upper end portions of which latter are screw-threaded to receive nuts 39 and 40, between which latter there are adjustably mounted on said tension-rods sleeves 41. In bearings 42 formed on the sleeves 41 is mounted an upper rock-shaft 43 to which is secured, near one end, an operating arm 44. Fast on the rock-shaft 43 is another arm 45, and pivotally connected to the arms 44 and 45 by links 46 and 47, respectively, is a squeezer-bar 48, to the ends of which are secured vertical channel-guides 49 that slidably engage coöperating guides 50 integral with or secured to the sleeves 41. On the lower side of the squeezer-bar 48 is a squeezer-block or plate 51 of such dimensions as to snugly fit within the upper open side of the cope. From the foregoing it will be apparent that the depression of the operating arm 44 will force the squeezer-bar and plate downwardly to the position shown in Fig. 2; the return of the squeezer-bar and plate to elevated position being effected by a spring 52 connected at its lower end to the squeezer-bar and at its upper end to a lug or ear 53 on the rock-shaft 43.

In the most complete form of the machine I equip the squeezer with an automatic mechanism for extracting a sprue, for use in the making of molds in which a sprue is employed. For this purpose, the squeezer-bar is provided, substantially centrally thereof, with an upstanding vertically slotted guide-post 54, on which is slidably mounted a cross-head 55. A laterally projecting portion 56 of the said cross-head carries a clamp 57 that supports a sprue-hook or extractor 58, which latter is adapted to reciprocate through a hole 59 formed through the squeezer-bar and plate. The cross-head 55 is reciprocated from the rock-shaft 43 by actuating connections comprising a rearwardly extending arm 60 fast on said rock-shaft, a link 61 connecting the rear end of said arm with a lever 62 pivoted centrally to the upper end of a post 63 mounted on the squeezer-bar, and a link 64 connecting the opposite end of said lever with the lower end of the cross-head 55. By reason of this mechanism, when the operating arm 44 is actuated to depress the squeezer-bar and plate, the sprue-hook is simultaneously depressed at a greater rate of speed, so that the latter passes through the hole 59 and engages a sprue 65 set in the upper portion of the mold, in a manner clearly shown in Fig. 8.

My invention also comprehends an improved means for automatically controlling the flow of motive fluid to a pneumatic vibrator; this mechanism being best shown in the detail view Fig. 7, wherein 66 designates a pneumatic supply pipe suitably connected to a portion of the stationary frame and connected with a valve-casing 67, this latter containing a valve indicated at 68, and having on its opposite side a nipple 69 that is connected by a suitable hose 70 with the cylinder 71 of any approved vibrator adapted to engage one end of the pattern-plate. The valve 68 is normally held closed by a spring 72, and it is opened by the engagement with the valve-stem of an arm 73 pivoted at its lower end at 74 to a bracket 75 secured to and carried by the pipe 66. The upper end of the arm 73 carries a roller 76 that, when the valve is closed, is forced by the spring 72 into engagement with a vertical guide 77 secured to or integral with one of the sleeves 11 of the flask-separating frame. On the inner side of the guide 77 is an inwardly projecting web or flange 78, the inner vertical edge of which is formed with a rib 79, thus forming a vertical guide-channel 80 between the guide 77 and the rib 79, through which the roller 76 passes on the descending movement of the flask-separating frame. To the upper end of the rib 79 is pivoted a spring-actuated cam 81 that normally closes the upper end of the guide-channel 80, and is so disposed as to lie in the path of the roller 76 during the rising movement of the flask-separating frame. The relation of the parts is such that, when the flask-separating frame is in its fully lowered position, as shown in Fig. 1, the roller 76 is above the cam 81 and in contact with the guide-walls 77, and the valve 68 is closed. As the frame rises, the cam 81 engages the roller and thereby swings the arm 73 inwardly to open the valve 68, this opening of the valve taking place just as the frame begins to raise the cope off the pattern-plate. As the frame continues to rise, the roller 76 passes off the cam 81 and down the outer edge of the rib 79 until, as the frame approaches the limit of its upward movement, the roller 76 sweeps across the lower end of the rib 79 and the arm 73 again swings outwardly, permitting the valve to close by the spring 72, and bringing the roller 76 into line with the lower end of the channel 80. On the subsequent descent of the flask-separating frame the roller 76 has a relative upward movement through the channel 80 and past the spring-actuated cam 81, the latter yielding to allow the roller to pass its free end. By this mechanism the vibration of the pattern-plate is gotten simultaneously with the lifting of the cope and is maintained during the separation of the cope from the pattern-plate and of the pattern-plate from the drag.

The operation of the machine has to a considerable extent already been indicated, but may briefly and consecutively be described as follows: In the operation of molding, the parts being in the relative positions shown in Fig. 1 with the flask-separating and spreading frame fully lowered, the flask is set, drag up, on the table 4, which table is of the same outside dimensions as the outside dimensions of the cope walls when in closed or contracted position. The drag is filled with sand, and a temporary board or cover-plate is applied which just snugly fits inside the walls of the drag. The flask is then taken off, inverted, and set, cope up, on the squeezer-table. The sprue is then set in the cope, the cope is filled with sand, and the squeezer mechanism is swung from the idle position shown in Fig. 3 to a position in which the squeezer-plate is directly over the cope, and the flask is then squeezed by depressing the lever 44, which at the same time carries the sprue-hook down into engagement with the sprue. After squeezing, the reverse movement of the lever 44, or the release of said lever and the energy of the spring 52, raises the squeezer-plate out of the flask and at the same time the sprue-hook extracts the sprue, and the squeezer mechanism is then swung to one side as indicated in Fig. 3. The central operating arm 8 on the rock-shaft 7 is then drawn toward the operator and swung to the relative position indicated in Figs. 3 and 9. This, through the described connections, raises the flask-separating and spreading frame, the first effect being the raising of the cope off the pattern-plate by the engagement of the notched portions of the end bars 13 of the frame with the studs 31 on the end walls of the cope, and the second effect is the raising of the pattern-plate off the drag by the subsequent engagement of the ends of the pattern-plate by the angle-iron lifters 25 as clearly shown in Fig. 10: so that, by the time the frame is fully raised the cope, pattern-plate and drag are fully separated, and during this separating movement the valve 68 is actuated in the manner described to effect the jarring of the pattern-plate. The pattern-plate is then slid out edgewise, and the cope is then lowered on to the drag, the pins 33 on the drag entering the holes in the ears 34 of the cope and thus locking the cope and drag against relative movement. The handle 24 of the spreading mechanism is then swung from the position shown in Fig. 1 to the position shown in Fig. 6, by which the walls of both the cope and drag are opened or spread sufficiently to clear the side walls of the contained mold, this spread position of the walls being shown in Figs. 4, 5, and 6. The elevating mechanism of the flask-raising frame is then again actuated from the arm or lever 8, thereby raising both the cope and drag off and above the mold, whereupon the latter, resting upon the temporary board or plate originally inserted in the top of the inverted flask, is drawn out and laid away, ready for pouring, and the described operations are repeated in making the next mold.

Where a sand-core is to be set, this may readily be done after the raising of the cope and the removal of the pattern-plate by simply swinging the cope upwardly and backwardly on one pair of its supporting studs 31 acting as hinges, setting the core in place, and then returning the cope to horizontal position and proceeding as before.

From the foregoing it will be seen that the machine of my invention reduces the manual handling of the flask during the complete operation of making a mold to the minimum; and this is a distinct advantage, not merely as saving time, labor and expense, but also in reducing the liability of accident and spoiling of the mold during its manufacture.

It will be manifest to those skilled in the art that the machine as described and shown might be modified in respect to minor details of structure and relative arrangement of the parts without involving any substantial change therein or affecting its principle of operation. Hence I do not limit the invention to the exact and particular mechanism disclosed except to the extent clearly indicated in the specific claims.

I claim—

1. In a molding machine of the character described, the combination with a main frame having a platform to support the flask and a pair of vertical guides, of a flask the cope whereof is provided with a pair of laterally projecting studs on each end wall thereof, and a flask-separating frame having sleeve members slidably mounted on said guides and horizontal lifting bars adapted to successively engage the studs of the cope and the ends of the pattern-plate as said flask-separating frame is raised, whereby to permit the removal of the pattern-plate without removing the flask from the machine, and means for actuating said flask-separating frame, substantially as described.

2. In a molding machine of the character described, the combination with a main frame having a platform to support the flask and a pair of vertical guides, of a flask the cope whereof is provided with a pair of laterally projecting studs on each end wall thereof and a flask-separating frame having sleeve members slidably mounted on said guides and horizontal lifting bars provided with notches in their upper edges forming seats for the studs of the cope, and other horizontal lifting bars adapted to engage the ends of the pattern plate as said flask-separating frame is raised, whereby the raised cope may be either bodily removed or swung upwardly to inclined position on its laterally projecting studs, substantially as described.

3. In a molding machine of the character described, the combination of a flask having jointed walls permanently connected at all the corners thereof and permitting a spreading movement of said walls, flask squeezing mechanism, mechanism for spreading the walls of the flask, and mechanism for raising the spread flask off the mold, substantially as described.

4. In a molding machine of the character described, the combination with a main frame and platform to support the flask, of a flask having jointed walls permanently connected at all the corners thereof and permitting a spreading movement of said walls, a flask-separating frame slidably mounted on said main frame and adapted, as the same is raised, to separate the cope, pattern-plate and drag vertically, means carried by said flask-separating frame for effecting a spreading of the walls of the flask, and means for actuating said flask-separating frame, substantially as described.

5. In a molding machine of the character described, the combination with a main frame and platform to support the flask, of a flask having jointed walls permitting a spreading movement of the latter, laterally projecting headed studs on opposed walls of said flask, a flask-engaging frame slidably mounted on said main frame and carrying members adapted to liftingly engage said studs, and means carried by said flask-engaging frame adapted to engage and thrust outwardly the heads of said studs and thereby effect a spreading of the walls of the flask, and means for actuating said flask-lifting frame, substantially as described.

6. In a molding machine of the character described, the combination with a main frame and platform to support the flask, of a flask comprising a cope and drag both having jointed walls permitting a spreading movement thereof, and an interposed pattern-plate, laterally projecting headed studs on opposed walls of said cope, a flask-separating frame slidably mounted on said main frame and carrying members adapted to liftingly engage, in succession, said studs and the ends of said pattern-plate, means mounted on said flask-separating frame adapted to engage and thrust outwardly the heads of said studs and thereby effect a spreading of the walls of the cope, and connections between the cope and the drag for transmitting the spreading movement of the former to the latter, substantially as described.

7. In a molding machine of the character described, the combination with means for supporting a flask, of a squeezer frame, a squeezer plate reciprocably mounted on said frame and formed with a transverse aperture, a sprue extractor mounted on the upper side of said squeezer plate and operable through the transverse aperture thereof, said sprue extractor being normally disconnected from but adapted, when lowered, to grip the sprue, and means for actuating said squeezer plate and sprue extractor, substantially as described.

8. In a molding machine of the character described, the combination with means for supporting a flask, of a squeezer frame, a squeezer plate reciprocably mounted on said frame and formed with a transverse aperture, a sprue extractor mounted on the upper side of said squeezer plate and operable through said transverse aperture, said sprue extractor being normally disconnected from, but adapted, when lowered, to grip the sprue, and means for simultaneously depressing said squeezer plate and sprue extractor, substantially as described.

9. In a molding machine of the character described, the combination with means for supporting a flask, of a squeezer-frame, a squeezer-plate reciprocably mounted on said frame, a sprue-extractor mounted on and operable through said squeezer-plate, means for depressing said squeezer-plate, and mechanism actuated by said last named means for simultaneously depressing said sprue-extractor at an increased rate of speed, substantially as described.

10. In a molding machine of the character described, the combination with means for squeezing a flask, and means for separating the cope, drag and pattern-plate of said flask, of a pneumatic vibrator, an air-pipe delivering motive fluid to the latter, a valve in said pipe, a spring normally maintaining said valve in closed position, and means actuated by the flask-separating means on its rising movement for opening said valve simultaneously with the inception of the flask-separating movement, substantially as described.

11. In a molding machine of the character described, the combination with means for squeezing a flask, and a vertically movable flask-separating frame, of a pneumatic vibrator, an air-pipe delivering motive fluid to the latter, a valve in said pipe, a spring normally maintaining said valve in closed position, a pivoted valve-actuating arm, and a cam carried by said flask-separating frame adapted to engage said arm on its upward movement and thereby open said valve simultaneously with the inception of the flask-separating movement, substantially as described.

ANDREW KOWALSKY.

Witnesses:
SAMUEL N. POND,
DAISY C. THORSEN.

Copies of this patent may be obtained for five cents each, by addressing the "Commissioner of Patents, Washington, D. C."